United States Patent [19]

Junker

[11] 3,836,216

[45] Sept. 17, 1974

[54] PRESSURE BALANCED SEAL ASSEMBLY

[75] Inventor: Arnold E. Junker, Bridge, Conn.

[73] Assignee: Avco Corporation, Stratford, Conn.

[22] Filed: Apr. 2, 1973

[21] Appl. No.: 347,233

[52] U.S. Cl. .............................. 308/187.1, 277/27
[51] Int. Cl. .......................... F16c 33/26, F16j 15/34
[58] Field of Search ............ 277/27, 3, 70, 71, 137, 277/195, 198; 308/187.1

[56] References Cited
UNITED STATES PATENTS

| | | | |
|---|---|---|---|
| 3,524,653 | 8/1970 | Vincent | 277/27 |
| 3,600,048 | 8/1971 | Makhobey | 277/27 |
| 3,743,303 | 7/1973 | Pope | 277/27 |

*Primary Examiner*—Harry N. Haroian
*Attorney, Agent, or Firm*—Charles M. Hogan; Gary M. Gron

[57] ABSTRACT

A pressure balanced seal assembly comprising a non-rotatable split carbon ring in sealing engagement with a rotatable shaft. A steel pressure balance ring has a pair of tabs which connect with the free ends of the split carbon ring. The outer periphery of the pressure balance ring is connected to a low pressure discharge so that pressure which acts to urge the carbon ring into the shaft also urges the pressure balance ring outward, thus urging the carbon ring toward an expanded position. This causes the carbon ring to be urged inward against the shaft with a substantially uniform force irrespective of the pressure acting on the carbon ring.

10 Claims, 2 Drawing Figures

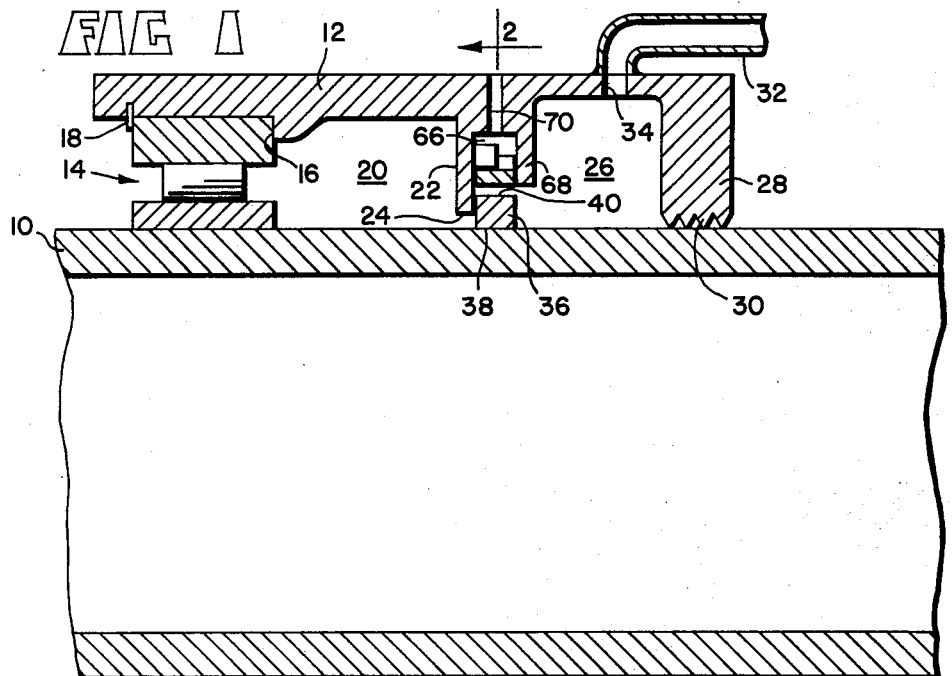
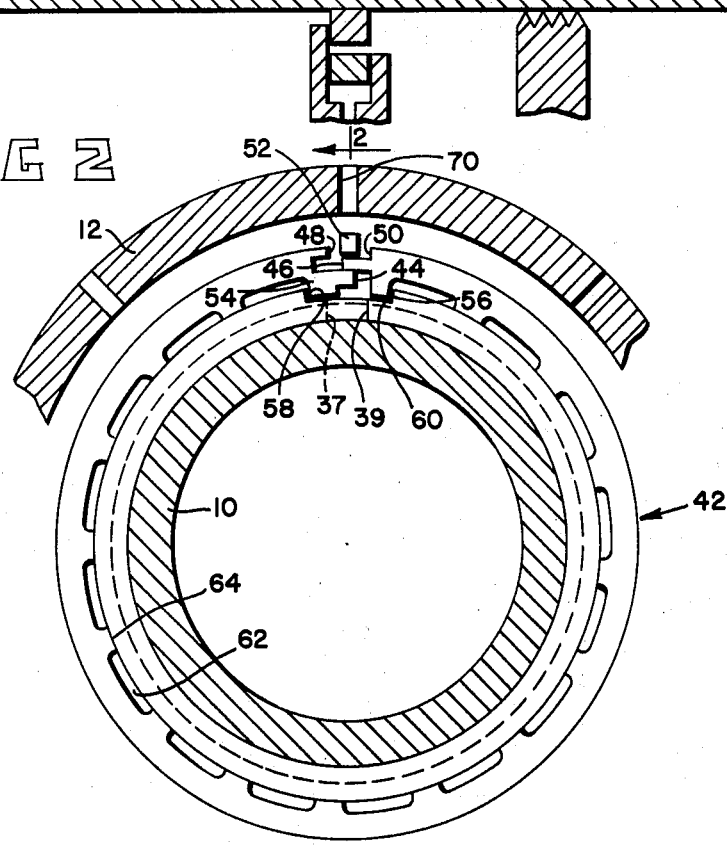

PRESSURE BALANCED SEAL ASSEMBLY

The present invention relates to seals and more specifically to seals between relatively rotating elements.

Carbon ring seals have been widely used in gas turbine engines between a rotating shaft and a bearing chamber to prevent the loss of lubricant. To further insure against the loss of lubricant, the exterior of the bearing chamber is exposed to a pressure higher than that inside so that any leakage is into the bearing chamber. This same pressure acts to urge the ring against the shaft. In the case of a gas turbine engine, this pressure is bled from its compressor. Since gas turbine compressor puts out a varying amount of pressure, the resultant pressure acting on the carbon ring can vary to a great extent. As the compressor pressure increases the resultant force acting to urge the carbon ring against the shaft increases in direct proportion. For seal arrangements of high relative speeds and high pressure differentials, the carbon ring would be urged against the shaft with such a force that it would tend to prematurely wear.

These problems are overcome by a seal assembly for first and second relatively rotating elements. A ringlike sealing element is nonrotatable with respect to the first element and abuts the second element, the sealing element being exposed to a pressure which urges it against the second element. A pressure balance ring adjacent the sealing element has a first surface facing the sealing element and a second surface facing away from it. The pressure balance ring has a means for connecting with the sealing element so that displacement of the pressure balance ring away from the sealing element urges the sealing element away from the second element. A pressure substantially lower than that acting to urge the sealing element against the second element is maintained on the second surface of the pressure balance ring so that the pressure acting on the sealing element urges the pressure balance ring away from the sealing element. This maintains a substantially uniform force urging the sealing element against the second element irrespective of variations in pressure.

The above and other related features of the present invention will be apparent from a reading of the following description of the disclosure shown in the accompanying drawing and the novelty thereof pointed out in the appended claims.

In the drawing:

FIG. 1 is a longitudinal section view of a seal assembly embodying the present invention; and FIG. 2 is a fragmentary cross-sectional view of the seal assembly of FIG. 1 taken on line 2—2 of FIG. 1.

Referring to FIG. 1 there is shown a shaft 10 relatively rotatable with respect to an annular housing 12 by means of a bearing assembly 14. Bearing assembly 14 is telescoped over shaft 10 and is secured against a shoulder 16 in the housing 12 by a retaining ring 18. Bearing assembly 14 is normally supplied with a source of lubricating fluid for lubrication and cooling. This is provided within a bearing sump chamber 20 defined by the housing 12 and by an integral radial wall 22 having an inner opening 24 in relatively close proximity to the shaft 10 to form an annular gap between the shaft 10 and the wall 22. A split carbon seal element 36 having overlapping free ends 37 and 39 surrounds shaft 10.

Seal element 36 sealingly abuts radial wall 22 of housing 12 so that the inner circumference 38 of ring 36 is in sliding sealing engagement with shaft 10.

The exterior of the sump chamber 20, for gas turbine applications, is pressurized with air to insure a constant inflow of air into the sump across seal element 36 and thus prevent leakage of lubricating fluid. This is provided by an annular sump pressurization annular chamber 26 formed in part by a flange 28. The inner circumference of flange 28 has a plurality of teeth 30 forming a labyrinth seal. A conduit 32 connected to a suitable source of pressurized air (e.g., compressor discharge air in a gas turbine engine) is connected to chamber 26 through opening 34.

With the pressure existing in chamber 26 there is a pressure differential created across seal element 36. Since the inner periphery 38 is in sliding sealing engagement with shaft 10, there exists a pressure gradient across its axial thickness that diminishes from the pressure existing in chamber 26 to the pressure in chamber 20. On the other hand, the periphery 40 of ring 36 is exposed only to the pressure in chamber 26. It can be seen then that there is a substantial net pressure urging ring 36 inward.

In accordance with the present invention there is counteracted to maintain a uniform pressure by a pressure balance ring 42. As herein shown, this is a steel ring surrounding the periphery 40 of carbon ring 36. The pressure balance ring 42 is split and has overlapping free ends 44 and 46. The pressure balance ring 42 also has recesses 48 and 50 formed at its outer periphery which are positioned adjacent an antirotation pin 52 suitably secured to radial wall 22. Pressure balance ring 42 also has a pair of tabs 54 and 56 adjacent its free ends which are received respectively in recesses 58 and 60 of the carbon ring 36.

A plurality of recesses 62 are formed around the inner circumference of pressure balance ring 42 to form a series of lands 64 which abut the outer periphery 40 of the carbon ring 36. Preferably, pressure balance ring 42 is formed from a flexible material, such as steel, adapted to compress seal element 36 inward under static conditions.

The pressure balance ring 42 is received in an annular recess 66 defined by the wall 22 and an additional wall 68. The clearance between the pressure balance ring 42 and the walls of recess 66 is shown in exaggerated proportions. However, in practice it would be selected to maintain a reasonable leakage rate across the side walls of the pressure balance ring 42. The recess 66 is connected to a low pressure discharge point by a series of ports 70 extending to the exterior of housing 12. In a gas turbine engine this low pressure discharge point may be simply an overboard connection. In other applications suitable low pressure sources may be provided.

In operation, shaft 10 rotates relative to housing 12 and pressurized air is supplied to chamber 26. The pressure in chamber 26 acts to urge the sealing element radially inward against shaft 10. However, at the same time this pressure acts radially outward on pressure balance ring 42 through the recesses 62. Since the outer periphery of sealing ring 42 is connected to the low pressure discharge existing in chamber 66, there is a resultant pressure force acting to expand pressure balance ring 42. Tabs 54 and 56 abut the free ends of sealing element 36 and expansion of the ring 42 radially outward causes the tabs 54 and 56 to also urge sealing element 36 toward an expanded state. As pressure in chamber 26 increases, it urges ring 36 inward against shaft 10 but at the same time the ring 42 expands to counterbalance this pressure force. The net result of this is that the element 36 sealingly engages the shaft 10 with a substantially uniform force irrespective in variations of pressure in chamber 26.

This is a significant advantage since it permits the use of higher seal pressurization pressures and higher relative speeds between the seal and the shaft. Furthermore, since the sealing ring 42 compresses the sealing element 36 inward in a static state the need for a garter-type spring around sealing element 36 is eliminated.

While the seal assembly described above has been discussed in connection with a radial seal, it should be apparent that it is equally applicable to an axial face seal using the same principle of the pressure balance ring connected to a low pressure discharge.

Having thus described the invention, what is novel and desired to be claimed and secured by Letters Patent of the United States is:

1. A seal assembly for first and second elements rotatable with respect to one another and having an annular gap therebetween, said seal assembly comprising:
   a ringlike sealing element positioned across said gap and nonrotatable with respect to said first element and abutting said second element, said sealing element being exposed to a pressure urging said sealing element against said second element;
   a pressure balance ring adjacent said sealing element and having a first surface facing said sealing element and a second surface facing away from said sealing element, said pressure balance ring having means for connecting with said sealing element so that displacement of said pressure balance ring away from said sealing element urges said sealing element away from said second element; and
   means for maintaining a pressure on the second surface of said pressure balance ring that is substantially lower than the pressure acting to urge said sealing element against said second element whereby said pressure balance ring is urged away from said sealing element to maintain a substantially uniform force urging said sealing element against said second element irrespective of variations in said pressure.

2. A seal assembly as in claim 1 wherein said pressure maintaining means comprises an annular element having an annular recess into which the second surface of said pressure balance ring extends, said element having at least one port extending to a low pressure source thereby to maintain a pressure differential across said pressure balance ring urging it away from said sealing element.

3. A seal assembly as in claim 1 wherein said sealing element is a split ring and said pressure balance ring is a split ring positioned around the periphery of said sealing ring whereby expansion of said pressure balance ring radially outward urges said sealing element away from said second element.

4. A seal assembly as in claim 3 wherein said connection means on said pressure balance ring comprises a pair of tabs at the free end thereof projecting into recesses adjacent the free end of said sealing ring.

5. A seal assembly as in claim 4 wherein said pressure balance ring has a series of recesses formed on its inner facing side in between a series of lands which abut the periphery of said sealing ring.

6. A seal assembly as in claim 5 wherein said pressure balance ring is formed from a flexible material and sized to compress said sealing ring against said second element under static conditions.

7. A seal assembly as in claim 5 further comprising a pin fixed to said first element and received in recesses adjacent the free end of said pressure balance ring thereby preventing said pressure balance ring and said sealing ring from rotating relative to said second element.

8. A seal assembly as in claim 7 wherein said first element comprises an annular housing including a radial wall having an opening and said second element comprises a shaft extending through said opening and rotatable in said housing.

9. A seal assembly as in claim 8 wherein said pressure maintaining means comprises an additional radial wall adjacent said first-mentioned radial wall to form a recess in said housing, said housing having at least one port connected to a low pressure source exterior of said housing, said recess being formed to receive the second surface of said pressure balance ring.

10. A seal assembly as in claim 9 further comprising:

a bearing assembly for journaling said shaft relative to said housing on one side of said radial wall; and means for forming a pressure chamber on the opposite side of said radial wall thereby providing said pressure force.

* * * * *